United States Patent
Tojo

(10) Patent No.: US 9,227,656 B2
(45) Date of Patent: Jan. 5, 2016

(54) ELECTRIC POWER STEERING SYSTEM

(71) Applicant: JTEKT CORPORATION, Osaka-shi, Osaka (JP)

(72) Inventor: Hirokazu Tojo, Kashiba (JP)

(73) Assignee: JTEKT CORPORATION, Osaka-Shi (JP)

( * ) Notice: Subject to any disclaimer, the term of this patent is extended or adjusted under 35 U.S.C. 154(b) by 0 days.

(21) Appl. No.: 14/219,446

(22) Filed: Mar. 19, 2014

(65) Prior Publication Data

US 2014/0291062 A1     Oct. 2, 2014

(30) Foreign Application Priority Data

Mar. 26, 2013   (JP) ................. 2013-064252

(51) Int. Cl.
    *B62D 5/04*          (2006.01)
    *F16K 15/14*        (2006.01)

(52) U.S. Cl.
    CPC ............ *B62D 5/0421* (2013.01); *B62D 5/0424* (2013.01); *F16K 15/148* (2013.01)

(58) Field of Classification Search
    CPC ...... B62D 5/04; B62D 5/0424; B62D 5/0442; F16K 15/148
    USPC ................................................ 180/443, 444
    See application file for complete search history.

(56) References Cited

U.S. PATENT DOCUMENTS

| | | | |
|---|---|---|---|
| 4,535,820 A * | 8/1985 | Raines .......................... | 137/854 |
| 6,065,561 A | 5/2000 | Howard | |
| 6,089,271 A * | 7/2000 | Tani ............................... | 137/854 |
| 6,272,947 B1 | 8/2001 | Howard | |
| 6,439,939 B1 | 8/2002 | Jaeger | |
| 6,817,437 B2 | 11/2004 | Magnus et al. | |
| 2006/0260703 A1* | 11/2006 | Johnson ........................ | 137/854 |
| 2012/0152645 A1 | 6/2012 | Matthias | |

FOREIGN PATENT DOCUMENTS

| | | |
|---|---|---|
| DE | 44 20 586 C1 | 11/1995 |
| DE | 10 2007 015 327 A1 | 10/2008 |
| DE | 10 2007 015 329 A1 | 10/2008 |
| DE | 10 2009 039 832 B2 | 1/2011 |

(Continued)

OTHER PUBLICATIONS

Jun. 25, 2014 Extended European Search Report issued in European Patent Application No. 13167590.2.

(Continued)

*Primary Examiner* — Anne Marie Boehler
(74) *Attorney, Agent, or Firm* — Oliff PLC

(57) ABSTRACT

A drainage device of an electric power steering system has a drain case and a drain valve. The drain case has a groove portion formed in a peripheral edge portion of a case inlet. The drain valve has a main body, and a flange disposed so as to face the case inlet. The flange has a bulged portion bulged toward the case inlet, and an annular seal portion. When the seal portion is brought into tight contact with the peripheral edge portion of the case inlet, the drainage device is placed in a valve closed state to form an annular space between the groove portion and the seal portion. When the seal portion is elastically deformed to form a gap between the seal portion and the peripheral edge portion of the case inlet, the drainage device is placed in a valve open state.

5 Claims, 4 Drawing Sheets

(56) References Cited

FOREIGN PATENT DOCUMENTS

| EP | 2 664 518 A2 | 11/2013 |
| WO | WO 2008/089910 A1 | 7/2008 |
| WO | WO 2011/026583 A2 | 3/2011 |

OTHER PUBLICATIONS

Jul. 17, 2014 Extended Search Report issued in European Patent Application No. 14160844.8.
Jan. 31, 2014 Office Action issued in U.S. Appl. No. 13/891,898.

* cited by examiner

ELECTRIC POWER STEERING SYSTEM

INCORPORATION BY REFERENCE

The disclosure of Japanese Patent Application No. 2013-064252 filed on Mar. 26, 2013 including the specification, drawings and abstract, is incorporated herein by reference in its entirety.

BACKGROUND OF THE INVENTION

1. Field of the Invention

The invention relates to an electric power steering system including a rack housing and a drainage device.

2. Description of the Related Art

Electric power steering systems (EPS) have a higher degree of flexibility in layout and consume smaller amount of energy than hydraulic power steering systems. Therefore, in recent years, adoption of electric power steering systems not only in small-sized vehicles but also in large-sized vehicles has been under contemplation. In response to this, a demand for high-powered electric power steering systems has been increasing. In order to meet such an increasing demand, so-called rack assist-type electric power steering systems have become widely available. In a rack assist-type electric power steering system, a rack shaft of a rack pinion-type steering mechanism is equipped with a ball screw mechanism capable of producing a high rack axial force with a high speed reduction ratio, and assist force from an electric motor is transmitted to the rack shaft via the ball screw mechanism. A known rack assist-type EPS is a belt-driven-type EPS that includes an electric motor disposed parallel to a rack shaft, a speed reducer in which and a belt is looped over a pulley provided on a shaft of the electric motor and a pulley provided on a ball nut rotatably fitted to a ball screw shaft portion of the rack shaft, and a rack housing that houses these components. The driving force produced by the electric motor is transmitted from the ball nut to the rack shaft via the belt. Because the EPS is attached to a lower part of the vehicle body, which is relatively close to a road face, end portions of the rack shaft are covered by resin boots that are formed in a bellows shape.

If gravel or the like hits the boot while a vehicle is travelling on a rough road and its impact force damages the boot, water may enter the rack housing from the damaged part. The water that has entered the rack housing is not naturally drained. If the vehicle is placed in a low-temperature environment with the water left inside the rack housing, the water remaining around the speed reducer may freeze, raising a possibility that the operation of the speed reducer will be impeded. In the belt-driven-type EPS, in particular, the belt and the pulley are stuck together so that the belt cannot be driven. For example, the specification of German Patent Application Publication No. 10 2009 039 832 describes an EPS in which a rack housing is equipped with a drainage device and thus water that has entered an internal space of the rack housing can be drained therefrom. As illustrated in FIG. 5, a drainage device 200 includes a drain case 210 formed of a first drain case 220 and a second drain case 230, and a drain valve 240 formed of an elastic member. The first drain case 220 has a case inlet 221 that communicates with an internal space of the rack housing, and the second drain case 230 has case outlets 231 that communicate with the outside of the rack housing. The drain valve 240 has a main body 241 and a flange 242. The flange 242 contacts a protrusion 222 formed on an inner face of the case inlet 221, thus closing the case inlet 221. The water that has entered the internal space of the rack housing flows into the drain case 220 through the case inlet 221, and accumulates on the flange 242. Then, due to the pressure of the water, the flange 242 elastically deforms as illustrated in FIG. 6, so that a gap is formed between the flange 242 and the protrusion 222 formed on the inner face of the case inlet 221, and the water flowing out through the gap is drained through the case outlets 231 to the outside of the rack housing.

However, in the drainage device 200 of the above-described EPS, the water uniformly spreads and accumulates on the flange 242 of the drain valve 240. This makes the water pressure low, resulting in low water drainage performance. Furthermore, because the area of contact between the flange 242 and the protrusion 222 formed on the inner face of the case inlet 221 is small, the sealing performance is low. Therefore, for example, when the drainage device 200 is submerged in water, the water may enter the internal space of the rack housing through the case outlets 231.

SUMMARY OF THE INVENTION

One object of the invention is to provide an electric power steering system including a rack housing with enhanced drainage performance and sealing performance, thus being usable under severe environments.

An electric power steering system according to an aspect of the invention includes: an electric motor disposed parallel to a rack shaft; a speed reducer including a pulley provided on a shaft portion of the electric motor and a pulley provided on a ball nut rotatably fitted to a ball screw shaft portion of the rack shaft, the pulley provided on the shaft portion and the pulley provided on the ball nut being connected to each other so that torque is transmittable between the pulleys; a rack housing that houses the speed reducer and a main portion of the rack shaft; and a drainage device disposed below the speed reducer housed in the rack housing. Driving force produced by the electric motor is transmitted to the rack shaft via the speed reducer. The drainage device has a drain valve made of an elastic member, and a drain case having a case inlet that communicates with an internal space of the rack housing and a case outlet that communicates with an outside of the rack housing. The drain case has a groove portion formed in a peripheral edge portion of an inner face of the case inlet. The drain valve has a main body formed in a columnar shape and fixed to the drain case, and a flange formed at one end of the main body and disposed so as to face the case inlet. The flange has a bulged portion formed at a center portion of the flange and bulged toward the case inlet, and an annular seal portion formed at a peripheral edge portion of the flange. When the seal portion is brought into tight contact with the peripheral edge portion of the inner face of the case inlet, the drainage device is placed in a valve closed state to form an annular space between the groove portion and the seal portion. When the seal portion is elastically deformed to faint a gap between the seal portion and the peripheral edge portion of the inner face of the case inlet, the drainage device is placed in a valve open state.

In the electric power steering system according to the above-described aspect, the water that has entered the internal space of the rack housing flows into the drainage device via the case inlet. The water that has flowed into the drainage device flows toward the peripheral edge portion of the flange without accumulating on the bulged portion formed at the center of the flange of the drain valve. In the valve closed state, the water that has flowed to the peripheral edge portion of the flange accumulates in the annular space formed between the seal portion and the groove portion formed in the peripheral edge portion of the inner face of the case inlet. When the amount of the water accumulated in the annular space reaches a prescribed amount, the pressure of the water causes the seal portion to elastically deform. Due to the elastic deformation of the seal portion, a gap is formed between the seal portion and the inner face of the case inlet, so that the drainage device is placed in the valve open state. In the valve open state, the water that has accumulated in the annular space flows into the lower space of the drain case via the gap, and is then drained out of the rack housing through the case outlet. When the amount of the water accumulated in the annular space becomes equal to or less than the prescribed amount due to the drainage of the water, the seal portion is brought into tight contact with the peripheral edge portion of the case inlet, so that the drainage device is placed in the valve closed state again. Because the water that has flowed into the drainage device is effectively gathered into the annular space, the water drainage performance is enhanced in the electric power steering system according to the above-described aspect. When the drainage device is in the valve closed state, the area of tight contact between the seal portion and the peripheral edge portion of the inner face of the case inlet is large. Therefore, entry of the water from the case outlet is blocked, and thus the sealing performance of the electric power steering system is enhanced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
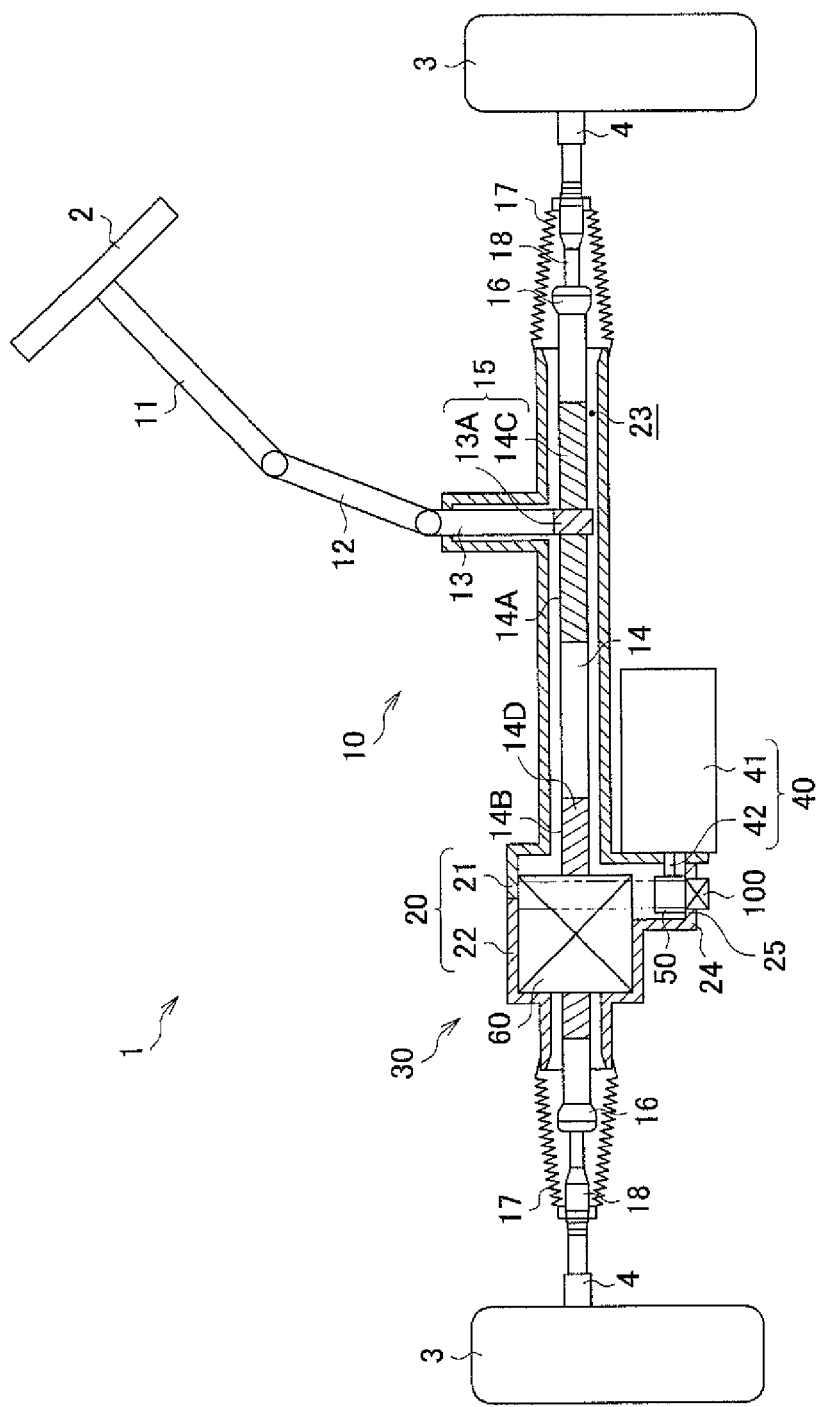
FIG. 1 is a sectional view illustrating an electric power steering system according to an embodiment of the invention.

Hereinafter, an electric power steering system according to an embodiment of the invention will be described with reference to the accompanying drawings. As illustrated in FIG. 1, an electric power steering system 1 is a rack parallel-type electric power steering system that includes a steering system main body 10, a rack housing 20, an assist device 30 and a drainage device 100, and that assists the operation of a steering wheel 2 using the assist device 30.

The steering system main body 10 includes a column shaft 11, an intermediate shaft 12, a pinion shaft 13, a rack shaft 14, a rack-and-pinion mechanism 15, ball joints 16, boots 17 and tie rods 18. As the steering wheel 2 is rotated, the column shaft 11, the intermediate shaft 12 and the pinion shaft 13 are rotated together with each other. In response to the rotation of the pinion shaft 13, the rack shaft 14 is moved in its longitudinal direction. In response to the movement of the rack shaft 14, the tie rods 18 are operated via the ball joints 16, so that the steered angle of steered wheels 3 is changed via knuckles 4.

The rack shaft 14 has a gear portion 14A and a threaded portion 14B. The gear portion 14A has a plurality of rack gear teeth 14C formed over a prescribed range in the direction of the central axis of the rack shaft 14. The threaded portion 14B has an external thread that serves as a rack screw 14D formed over a prescribed range in the direction of the central axis of the rack shaft 14.

The rack-and-pinion mechanism 15 converts the rotation of the pinion shaft 13 into a translational movement of the rack shaft 14, using a pinion gear 13A of the pinion shaft 13 and the rack gear teeth 14C of the rack shaft 14.

The rack housing 20 is formed by coupling a first housing 21 and a second housing 22 together, and an internal space 23 is formed in the rack housing 20. The internal space 23 accommodates therein the pinion shaft 13, the rack shaft 14, and the ball joints 16, in addition to a speed reducer 50, a ball screw mechanism 60 and a support device 70 that constitute the assist device 30.

Each boot 17 is made of an elastic resin material, and is attached to a corresponding one of end portions of the rack housing 20 and to a corresponding one of the tie rods 18. Each boot 17 covers a corresponding one of the ball joints 16 provided on parts of the rack shaft 14 that are protruded from the rack housing 20 and a corresponding one of the tie rods 18, thereby suppressing entry of foreign matter into the internal space 23 of the rack housing 20 from the outside.

The assist device 30 includes an electric motor 40, the speed reducer 50, the ball screw mechanism 60 and the support device 70 (not illustrated in FIG. 1). The rotation output from the electric motor 40 is transmitted to the ball screw mechanism 60 by the speed reducer 50, so that the ball screw mechanism 60 rotates. Thus, the rack shaft 14 is supplied with a force that acts in the direction of the central axis of the rack shaft 14.

The drainage device 100 is attached to a valve fixed portion 25 of the second housing 22, which is located below the speed reducer 50. The drainage device 100 drains the water that has entered the internal space 23 of the rack housing 20 to the outside of the rack housing 20.

Figure 2:
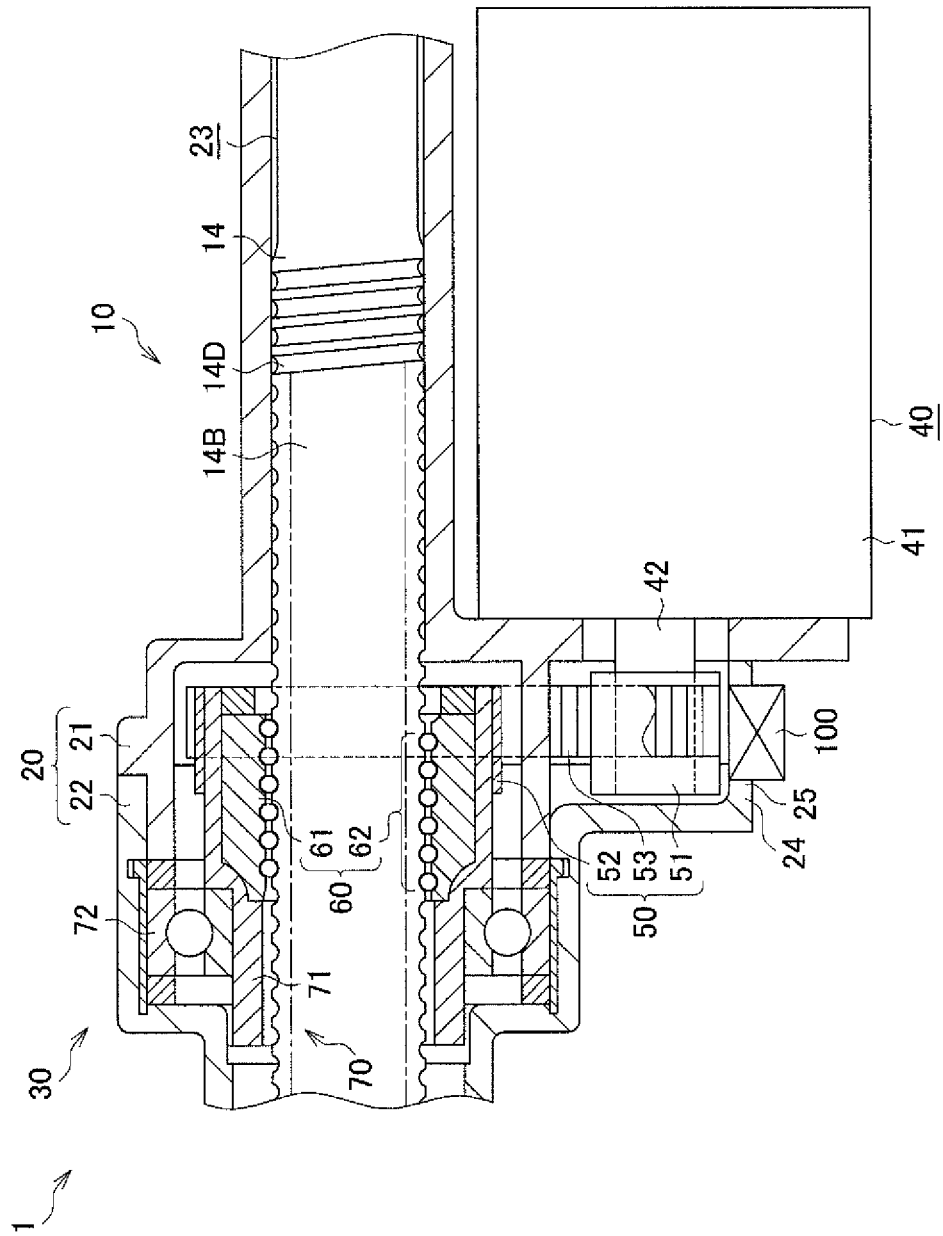
FIG. 2 is a sectional view illustrating a rack shaft of the electric power steering system according to the embodiment of the invention, taken along the direction of the central axis of the rack shaft.

The configuration of the assist device 30 will be described. As illustrated in FIG. 2, the electric motor 40 is attached to an outer face of the rack housing 20. The electric motor 40 includes a motor main body 41 and a motor shaft 42. The motor main body 41 is fixed to the first housing 21. The electric motor 40 rotates the ball screw mechanism 60 via the speed reducer 50.

The motor shaft 42 extends from the inside the motor main body 41 into the internal space 23 of the rack housing 20. The motor shaft 42 rotates as electric current is supplied to the motor main body 41.

The ball screw mechanism 60 is disposed around the threaded portion 14B of the rack shaft 14, and is rotatable about the central axis of the rack shaft 14 relative to the rack shaft 14. The ball screw mechanism 60 has a nut 61 and balls 62. As the nut 61 is rotated, the mechanism 60 supplies the rack shaft 14 with a force that acts in the direction of the central axis of the rack shaft 14.

The speed reducer 50 includes a drive pulley 51, a driven pulley 52 and a transmission belt 53. The drive pulley 51 is fixed to the motor shaft 42, and the driven pulley 52 is fixed to a rotation support member 71. The transmission belt 53 is looped over the drive pulley 51 and the driven pulley 52, so that the rotation of the drive pulley is reduced in speed by the driven pulley 52.

The support device 70 is disposed around the threaded portion 14B of the rack shaft 14 and the ball screw mechanism 60. The support device 70 supports the rotation of the nut 61 relative to the rack housing 20 and the rack shaft 14.

The rotation support member 71 is fixed to an outer periphery of the nut 61, and is rotatably supported by the housing 20 via a ball bearing 72. As the transmission belt 53 is rotated, the rotation support member 71 rotates about the central axis of the rack shaft 14 relative to the rack shaft 14.

The operation of the assist device 30 will be described. The assist device 30 rotates the motor shaft 42 of the electric motor 40 and the drive pulley 51 in response to the rotation of the steering wheel 2 (see FIG. 1). The drive pulley 51 rotates, via the transmission belt 53, the driven pulley 52, the rotation support member 71 and the nut 61, thereby supplying, via the balls 62, the rack shaft 14 with a force that acts in the direction of the central axis of the rack shaft 14.

Figure 3:
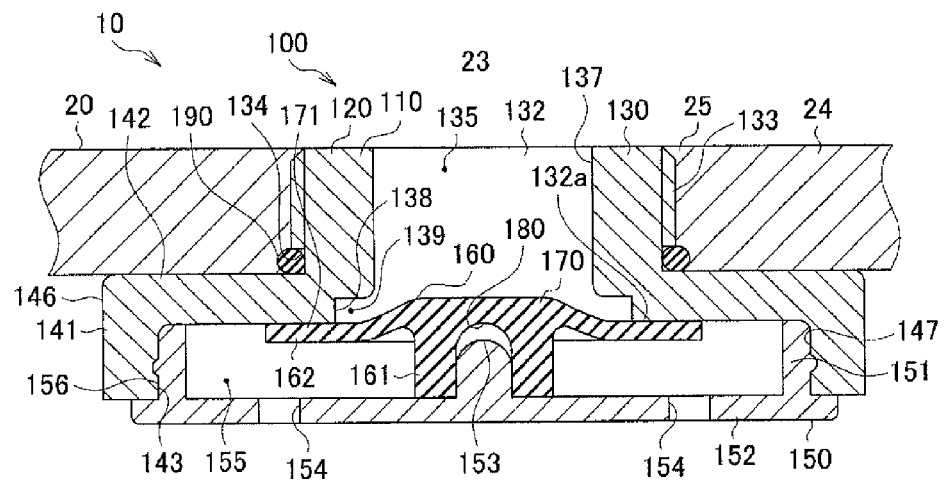
FIG. 3 is a sectional view illustrating a valve closed state of a drainage device of the electric power steering system according to the embodiment of the invention.

The configuration of the drainage device 100 will be described. As illustrated in FIG. 3, the drainage device 100 includes a drain case 110, a drain valve 160 and a seal ring 190. The drain case 110 is formed by coupling together a first drain case 120 and a second drain case 150 that are each made of a resin material.

The first drain case 120 has a case inlet 132, a case screw 133 and a ring groove 134. By the case screw 133 formed on an outer peripheral face 136 of the first drain case 120, the first drain case 120 is attached to the valve fixed portion 25 of the second housing 22. The first drain case 120 communicates with the internal space 23 of the rack housing 20 via the case inlet 132. A groove portion 138 is formed in a peripheral edge portion of an inner face 132a of the case inlet 132.

A case upper portion 130 of the first drain case 120 is formed in a cylindrical shape, and has an upper space 135 that is defined by an inner peripheral face 137 of an upper peripheral wall portion 131. The case upper portion 130 provides communication between the upper space 135 and the internal space 23 of the rack housing 20 via the case inlet 132.

A case lower portion 140 of the first drain case 120 is formed in an annular shape or a hexagonal shape, and has a lower peripheral wall portion 141, a boundary portion 142 and an opening portion 143. The case lower portion 140 is attached to the valve fixed portion 25 in such a manner that an outer peripheral face 146 of the case lower portion 140 is located outside the second housing 22.

The second drain case 150 is formed in an annular shape or a hexagonal shape corresponding to the shape of the case lower portion 140, and has a peripheral wall portion 151, a bottom wall portion 152, case outlets 154 and an internal space 155. The second drain case 150 attached to the first drain case 120, with an outer peripheral face 156 of the second drain case 150 facing an inner peripheral face 147 of the case lower portion 140, and is fixed to the first drain case 120 by press-fitting the peripheral wall portion 151 to the inner peripheral face 147. Via the case outlets 154, the internal space 155 communicates with a space outside the rack housing 20. The case outlets 154 are formed at multiple locations so as to be arranged at equal intervals around the central axis of the second drain case 150, and extend through the bottom wall portion 152. A protrusion 153 to which the drain valve 160 is fixed is formed at the center of the bottom wall portion 152.

The seal ring 190 is made of an elastic resin material, formed in an annular shape, and is fitted into the ring groove 134 of the first drain case 120. The seal ring 190 provides sealing between the valve fixed portion 25 of the second housing 22 and the outer peripheral face 136 of the first drain case 120.

The drain valve 160 is made of an elastic resin material that has an elasticity higher than the resin material of the drain case 110, for example, made of a silicone rubber or the like. The drain valve 160 is a single-piece member having a main body 161 and a flange 162 formal at one end of the main body 161.

The main body 161 is formed in a columnar shape, and a recessed portion 180 is formed in a bottom portion at the other end of the main body 161. The drain valve 160 is fixed to the drain case 110 by fitting the protrusion 153 of the second drain case 150 into the recessed portion 180 of the main body 161. When the drain valve 160 is fixed to the drain case 110, the flange 162 faces the case inlet 132.

The flange 162 is larger in diameter than the case inlet 132 of the drain case 110. The flange 162 has a bulged portion 170 that is formed at the center of the flange 162 and bulged toward the case inlet 132, and also has an annular seal portion 171 formed at a peripheral edge portion thereof. The seal portion 171 is pressed against the peripheral edge portion of the inner face 132a of the case inlet 132. Due to the restoring force caused by pressing the seal portion 171 against the peripheral edge portion, the seal portion 171 tightly contacts the peripheral edge portion of the inner face 132a of the case inlet 132, so that an annular space 139 is formed between the groove portion 138 and the seal portion 171.

In the drainage device 100, the drain valve 160 and the drain case 110 constitute a valve unit, so that either a valve closed state or a valve open state is created between the case inlet 132 and the case outlets 154. The drainage device 100 is placed in the valve closed state when the seal portion 171 tightly contacts the peripheral edge portion of the inner face 132a of the case inlet 132, and is placed in the valve open state when the seal portion 171 is elastically deformed so that a gap is formed between the seal portion 171 and the peripheral edge portion of the inner face 132a of the case inlet 132.

In the electric power steering system 1 configured as described above, if either one of the boots 17 illustrated in FIG. 1 is damaged, water enters the boot 17 from the outside of the electric power steering system 1 via a damaged part and the water then enters the internal space 23 via the opening of the rack housing 20.

The water that has entered the internal space 23 of the rack housing 20 moves along a wall face of the first housing 21 or the second housing 22 and then reaches a wall face of the housing bottom wall portion 24 of the second housing 22, which is located below the speed reducer 50.

As illustrated in FIG. 3, the water that has reached the wall face of the housing bottom wall portion 24 flows into the upper space 135 of the first drain case 120 via the case inlet 132 of the drainage device 100 attached to the valve fixed portion 25 of the second housing 22. The water that has flowed into the upper space 135 of the first drain case 120 flows toward the peripheral edge portion of the flange 162 without accumulating on the bulged portion 170 formed at the center of the flange 162 of the drain valve 160. In the valve closed state, the water that has flowed to the peripheral edge portion of the flange 162 accumulates in the annular space 139 formed between the seal portion 171 and the groove portion 138 formed in the peripheral edge portion of the inner face 132a of the case inlet 132.

Figure 4:
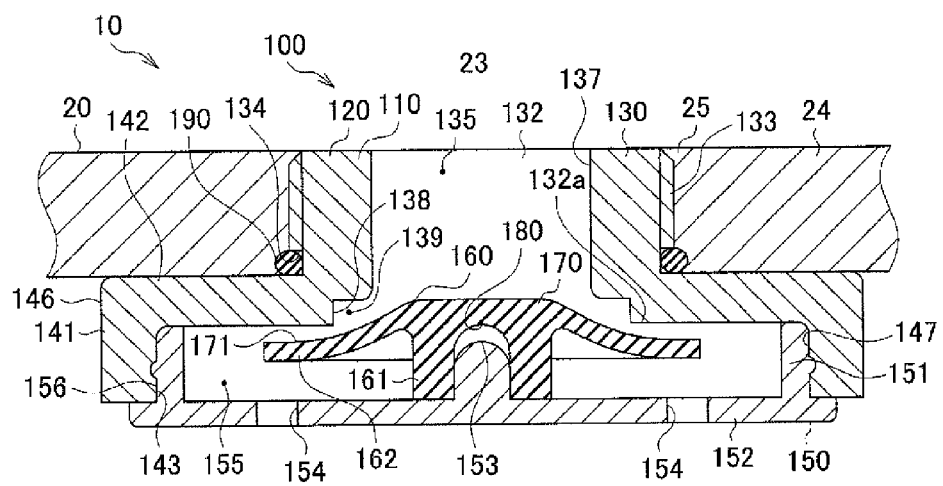
FIG. 4 is a sectional view illustrating a valve open state of the drainage device of the electric power steering system according to the embodiment of the invention.
Figure 5:
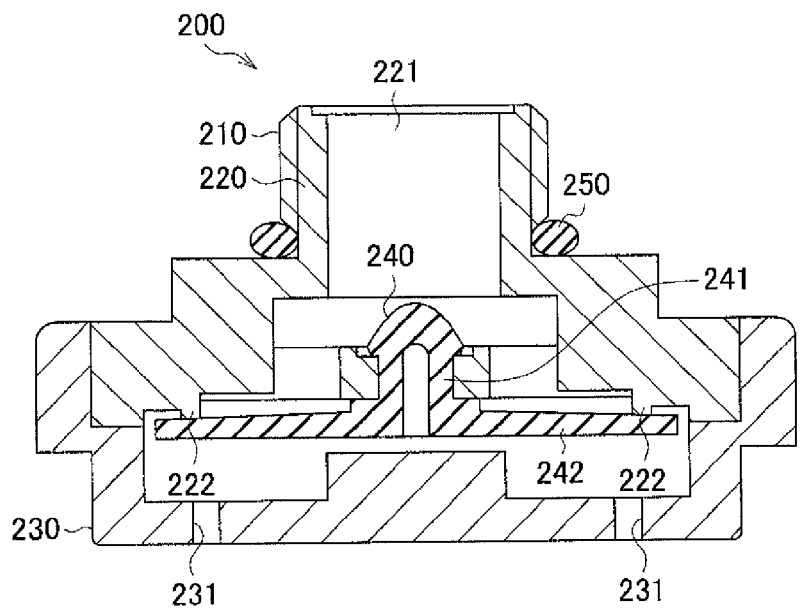
FIG. 5 is a sectional view illustrating a valve closed state of a drainage device of a conventional electric power steering system.
Figure 6:
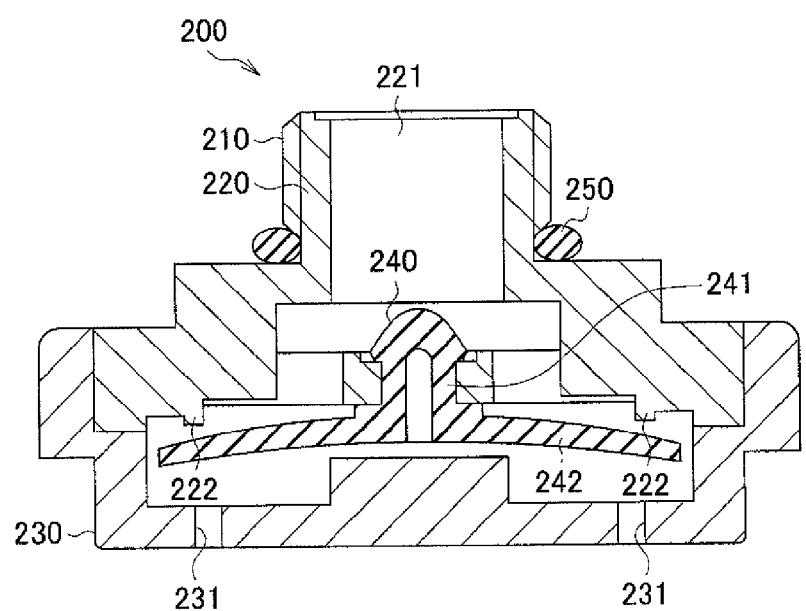
FIG. 6 is a sectional view illustrating a valve open state of the drainage device of the conventional electric power steering system.

As illustrated in FIG. 4, when the amount of the water accumulated in the annular space 139 reaches a prescribed amount, the pressure of the water causes the seal portion 171 to elastically deform downward. Due to the elastic deformation of the seal portion 171, a gap is formed between the seal portion 171 and the inner face 132a of the case inlet 132 to provide communication between the annular space 139 and the internal space 155 of the second drain case 150, thus achieving the valve open state. In the valve open state, the water that has accumulated in the annular space 139 flows into the internal space 155 of the second drain case 150 via the gap, and is then drained out of the rack housing 20 through the case outlets 154.

When the amount of the water accumulated in the annular space 139 becomes equal to or less than the prescribed amount due to the drainage of the water, the reduced water pressure allows the seal portion 171 of the drain valve 160 to restore its original shape. As a result, the seal portion 171 tightly contacts the peripheral edge portion of the case inlet 132 and the gap between the annular space 139 and the internal space 155 of the second drain case 150 is eliminated, so that the drainage device 100 is placed in the valve closed state again.

Because the water that has flowed into the drainage device 100 is effectively gathered into the annular space 139 and then is drained therefrom, the water drainage performance is enhanced in the electric power steering system 1. When the drainage device 100 is in the valve closed state, the area of tight contact between the seal portion 171 and the peripheral edge portion of the inner face 132a of the case inlet 132 is large. Therefore, entry of the water from the case outlets 154 is blocked, and thus the sealing performance of the electric power steering system 1 is enhanced.

What is claimed is:

1. An electric power steering system comprising:
   an electric motor disposed parallel to a rack shaft;
   a speed reducer including a pulley provided on a shaft portion of the electric motor and a pulley provided on a ball nut rotatably fitted to a ball screw shaft portion of the rack shaft, the pulley provided on the shaft portion and the pulley provided on the ball nut being connected to each other so that torque is transmittable between the pulleys;
   a rack housing that houses the speed reducer and a main portion of the rack shaft; and
   a drainage device disposed below the speed reducer housed in the rack housing,
   wherein driving force produced by the electric motor is transmitted to the rack shaft via the speed reducer, and
   wherein the drainage device has a drain valve made of an elastic member, and a drain case having a case inlet that communicates with an internal space of the rack housing and a case outlet that communicates with an outside of the rack housing, wherein
      the drain case has a groove portion formed in a peripheral edge portion of an inner face of the case inlet,
      the drain valve comprises a main body formed in a columnar shape, the columnar shape having (1) a first end that is proxminal to and faces the case inlet, and (2) a second end that is distal from and faces away from the case inlet, the main body being fixed to the drain case,
      the drain valve further comprises a flange formed at the first end of the columnar shape of the main body and disposed so as to face the case inlet,
      the flange has a bulged portion formed at a center portion of the flange and bulged toward the case inlet, an annular seal portion formed at a peripheral edge portion of the flange, and an annular intermediate portion between the bulged portion and the annular seal portion, the annular intermediate portion having an upper surface facing the case inlet and a lower surface facing away from the case inlet, the lower surface of the annular intermediate portion sloping down from the first end towards the second end with increasing distance from an central axis of the columnar shape, the central axis extending between the first end and the second end, the lower surface of the annular intermediate portion being closer to the case inlet than the second end, the bulged portion being located at the first end of the columnar shape of the main body, the second end of the columnar shape of the main body protruding away from the flange in a direction away from the inlet,
      when the seal portion is brought into tight contact with the peripheral edge portion of the inner face of the case inlet, the drainage device is placed in a valve closed state to form an annular space between the groove portion and the seal portion, and
      when the seal portion is elastically deformed to form a gap between the seal portion and the peripheral edge portion of the inner face of the case inlet, the drainage device is placed in a valve open state.

2. The electric power steering system according to claim 1, wherein:
   a bottom face of the drain case has a protrusion protruded toward the case inlet, and the second end of the columnar shape of the main body of the drain valve has a recessed portion in which the protrusion is fitted; and
   the drain valve is fixed to the drain case by fitting the protrusion in the recessed portion.

3. The electric power steering system according to claim 1, in a direction parallel to the central axis, the annular seal portion being closer to the case inlet than the second end and being further away from the case inlet than the first end.

4. The electric power steering system according to claim 1, wherein:
   the entire seal portion is sealed with the peripheral edge portion in the valve closed state.

5. The electric power steering system according to claim 1, wherein:
   the bulged portion is distanced from the groove portion in the valve closed state.

* * * * *